United States Patent [19]

Douglas et al.

[11] 4,264,953

[45] Apr. 28, 1981

[54] VIRTUAL CACHE

[75] Inventors: Robert H. Douglas; Thomas L. Phinney, both of Phoenix, Ariz.

[73] Assignee: Honeywell Inc., Minneapolis, Minn.

[21] Appl. No.: 25,679

[22] Filed: Mar. 30, 1979

[51] Int. Cl.³ .................. G06F 15/16; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,786,427 | 1/1974 | Schmidt | 364/200 |
| 4,020,466 | 4/1977 | Cordi | 364/200 |
| 4,096,573 | 1/1978 | Heller | 364/200 |
| 4,136,385 | 1/1979 | Gannon | 364/200 |

*Primary Examiner*—James D. Thomas

*Attorney, Agent, or Firm*—Lockwood D. Burton; Mitchell J. Halista

[57] ABSTRACT

A computer system includes a main memory and a cache memory arrangement, wherein a cache memory unit is associated with each of the several CPU's in the system. Each cache responds to the virtual address signals issued by the associated CPU, in parallel with a mapper unit which, in turn, converts the virtual address signals to physical address signals for addressing the main memory. The cache is subdivided into subunits each responding to a particular program of a multiprogram CPU. When any of the CPUs address a shared portion of the main memory, the mapper unit recognizes the address of the shared portion of the main memory and issues an inhibit signal to inhibit the operation of the cache memory unit to prevent data from the shared portion of the main memory from being stored in the cache.

5 Claims, 5 Drawing Figures

VIRTUAL CACHE

BACKGROUND OF THE INVENTION

The present invention relates to computer systems. More particularly, it relates to a virtual cache arrangement for use in such a computer system.

In the art relating to computer systems, it has been found that a significant limiting factor in the performance of large computers is the access time of a central processor unit to the Main Memory. The access time to the main memory in such computer systems is due largely to arbitration and bus delays in the memory access path. On the other hand, high speed random access memories (RAMs) provide a memory with a much faster access time. It is not, however, economically feasible to make a fast, large main memory from high speed random access memories.

It has been found that the effective access time of the memory of a large computer system may be improved, while the main memory continues to be of the relatively slow access type, by the addition of a smaller random access memory that is located close to and used exclusively by the CPU. That small random access memory has a much faster access time than the Main Memory and is referred to in the art as a cache memory. In at least one exemplary embodiment of a computer employing a cache memory, the cache had a capacity of 1,024 words while the Main Memory had a capacity for 256,000 words or more. Experience has shown that the locus of reference of computer programs is relatively small. In the exemplary structure hereinbefore noted, this system easily achieves a 90% hit ratio. That is, over an extended period of time, over 90% of the data requested from memory was found in the cache.

The conventional structure of a cache includes a Content Addressable Memory and a Data Memory. The Content Addressable Memory is used to relate the address supplied by the processor with a location in the Data Memory containing the value of the word. When the CPU makes a memory request, the address is presented to the Content Addressable Memory. If the content of that address is present in the cache, a "hit" occurs and this data may be fetched from cache. If the Content Addressable Memory does not indicate that the requested address is present, a "miss" occurs and the data must be fetched from the Main Memory in the usual way. As the data is read from the Main Memory, it is also loaded into the cache with the high probability that the CPU will request the content of that location in the near future.

While such cache memories have been successfully operated in a straight-forward system featuring a single central processor unit and a single Main Memory, complications have arisen where a plurality of data processors all have access to the one Main Memory. Although each of the central processors would have its own associated cache memory, there will be portions of the Main Memory which are shared by all of the CPUs. Thus, if a particular address from the Main Memory is stored in the cache associated with at least one of the CPUs, and another CPU then updates that data in the Main Memory, the data stored in the cache will be inconsistent with the data stored in the Main Memory resulting in an error if that data is called for.

Similarly, in recent practice, CPUs have been developed capable of multiple programming arrangements whereby the CPU may be operated intermittently under the control of several unrelated programs. If, under these conditions, the cache is associated with the CPU, every time the CPU switches to a different program, the "hit" rate of access to the cache drops dramatically because the data in the cache associated with the new program is unrelated to the old program and, hence, is drawn from a different portion of the Main Memory from that associated with another program. Therefore, the content of the cache at program switch time is irrelevant to the second or subsequent program. The necessity for reloading the cache each time the CPU switches from one program to another significantly slows the operation.

Typically, in present systems, the addresses in the processor are translated from the program address, or virtual address, to a memory, or physical address. That address translation is effected by an address translator, or mapper. The translation values are different for each program being run. For example, address "O" will be converted by the mapper into three different physical addresses for three programs A, B and C.

To access the contents of a memory location in the current systems, the CPU presents the virtual address to the mapper; the mapper converts the virtual address to a physical address; the physical address is then applied to the associative memory of the cache and a check for a "hit" is performed as hereinbefore described. Because physical addresses are used by the cache, operation must proceed sequentially with the virtual-to-physical address translation proceeding the cache look-up.

SUMMARY OF THE INVENTION

It is, accordingly, an object of the present invention to provide an improved cache memory arrangement for computer systems which avoids the foregoing shortcomings.

In accomplishing this and other objects, there has been provided, in accordance with the present invention, a cache arrangement for a computer system wherein a cache memory unit is associated with each of the several CPUs in the system. Each cache responds to the virtual address signals issued by the CPU in parallel with a mapper which, in turn, converts the virtual address signals to physical address signals for addressing the Main Memory. The cache is subdivided into subunits each responding to a particular program for a multiprogram CPU. Means are also provided for identifying those addresses of Main Memory which are shared with other CPUs. That identifying signal is used to inhibit the storing in the cache of data and addresses from the shared portions of the memory. Means are also provided to purge the cache of data.

BRIEF DESCRIPTION OF THE DRAWINGS

A better understanding of the present invention may be had from the following detailed description when read in the light of the accompanying drawings in which.

DETAILED DESCRIPTION

Figure 1:
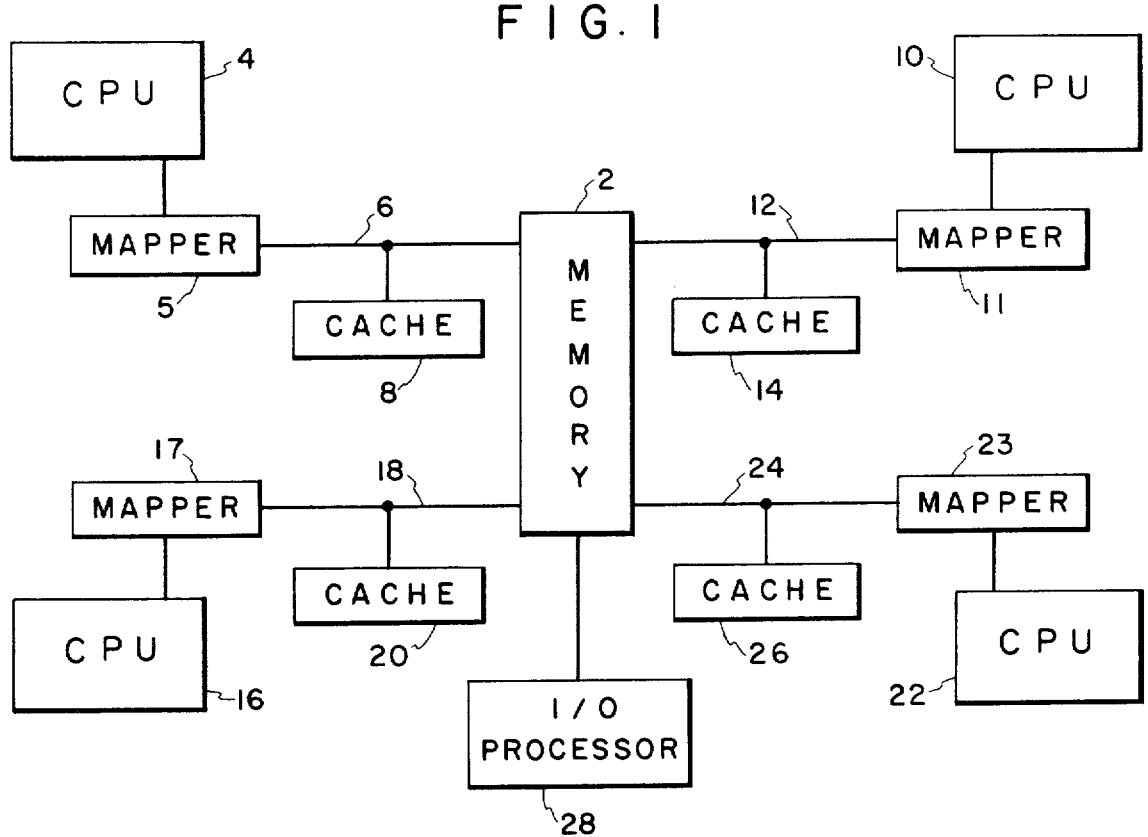
FIG. 1 is a block diagram representative of a computer system having a shared memory.

Referring now to the drawing in more detail, there is shown in FIG. 1 a Main Memory 2. A first CPU 4 is connected by a bus 6 to the Main Memory 2. In the structure illustrated in FIG. 1, a plurality of CPUs are shown in communication with the one Main Memory 2. That plurality is represented by four such CPUs and their associated circuitry. Thus a first CPU 4 is connected through a mapper 5 to the memory 2 by a bus 6. A cache 8 is connected to the bus 6 to be used exclusively with the CPU 4. Similarly a CPU 10 is connected through a mapper 11 to the memory 2 by way of a bus 12. A cache 14 is connected to the bus 12 for the exclusive use with the CPU 10. A CPU 16 is connected through a mapper 17 to the memory 2 by a bus 18. A cache 20 is connected to the bus 18 for use exclusively with the CPU 16. A forth CPU 22 is connected through a mapper 23 to the memory 2 by a bus 24 to which a cache 26 is connected for use with the CPU 22. An input/output processor 28 is also connected to the Main Memory 2. The processor 28 responds to control signals from a CPU to effect a control over selected output devices, or responds to signals from the CPU to supply data from connected input devices to the memory 2. The I/O processor 28 transfers data between the memory 2 and associated I/O devices.

In the establishment of such systems as shown in FIG. 1, there will be portions of the Main Memory 2 which are, at a given time, dedicated, respectively, to each of the CPUs 4, 10 and 16 and 22. There will, however, be portions of the memory 2 which are shared by the several CPUs. It is the shared portion of the memory which tends to cause problems in the use of cache memories. For example, suppose that the CPU 4 had recently called for information from a particular address in the shared portion of the memory 2 and had that data and address stored in its cache 8. Then suppose that the CPU 22 has communication with the same address in the shared portion of the memory 2 and has, through its manipulation, changed the data in that address. We now have a situation where the cache 8 has a record of the address of the data in the memory 2 and, should the CPU 4 again call for that address, it would find the address in the cache 8 and would read the data therefrom but the data would be incorrect because it is inconsistent with the present data in the corresponding address in the memory 2. In an effort to avoid such inaccuracies, it has been customary to have means provided whereby the memory is constantly monitored by all CPUs and their associated caches and corrective measures taken whenever such a change in the data occurs.

As noted above, the signal from the CPU calling forth data from the memory location includes a virtual address of the data in the memory. The virtual address is converted in the mapper to a physical address which may then be referenced to the Main Memory 2. The cache, as shown in FIG. 1, responds to the physical address corresponding to the physical address in the memory. With the cache following the mapper and responding to the physical address, the operation is further slowed in that the cache must await the conversion of the signal from a virtual address to a physical address before the cache can respond.

Figure 2:
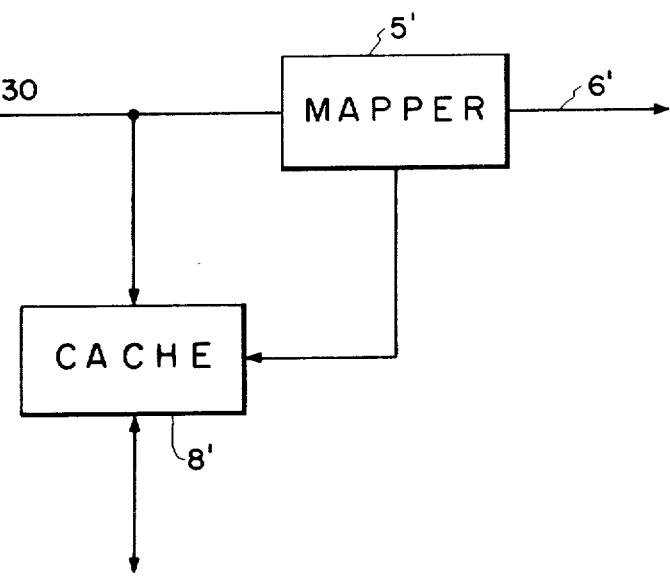
FIG. 2 is a block diagram of a cache memory arrangement in accordance with the present invention.

In accordance with one aspect of the present invention as illustrated in FIG. 2, a CPU 4' is connected to a mapper 5' by an interconnecting means 30. A cache 8' is connected to the interconnecting means 30 to respond directly to the virtual address signals issued from the CPU 4'. Inasmuch as the cache 8' is to be used exclusively by the CPU 4', it may be organized to respond to the virtual address signals issued by the CPU. Accordingly, it is not necessary for the cache to be responsive to the physical address signals representing the actual address in the Main Memory 2. Thus, the cache memory 8' may be operating simultaneously with the mapper 5', avoiding the necessary sequential time delay encountered in the arrangement shown in FIG. 1.

When the CPU addresses a portion of the Main Memory which is shared with the other CPUs, that address is recognized in the mapper 5' to produce an inhibit signal for the cache 8'. In the basic system arrangement shown in FIG. 1 modified in accordance with the structure shown in FIG. 2, each of the CPUs would be provided with a cache responsive to the virtual address signals rather than the physical address signals, and would have the inhibit signal generated from the associated mapper as shown in FIG. 2. Thus, none of the cache memory units would be responsive to any address in the shared portion of the Main Memory. With this arrangement, the shared portion of the Main Memory is never stored in the cache. The cache memories will only contain data and addresses corresponding to the respective portions of the Main Memory dedicated to the associated CPU. Accordingly, the need for each of the CPUs and the associated cache to constantly monitor the shared portion of the main memory 2 is eliminated without the probability of introducing resulting errors. Since access to the shared portion of the memory is usually a very small portion of the memory data required by the several central processor units, the "hit" rate is not seriously impaired.

It was mentioned hereinbefore that one of the difficulties encountered in previous cache memory arrangements was that involved with multiple programming of individual central processor units. If the cache were identified with the central processor unit, per se, each time the CPU switched to a different program within its operating system, the data stored in the cache would not be used by the new program, since programs within a CPU only infrequently share data. It would, therefore, require that each bit of data required by the CPU for the new program would of necessity be retrieved from the main memory and stored in the cache for subsequent use. Until the cache memory becomes loaded with the working data necessary for the new program, all of the data must be obtained from the slower Main Memory.

Figure 3:
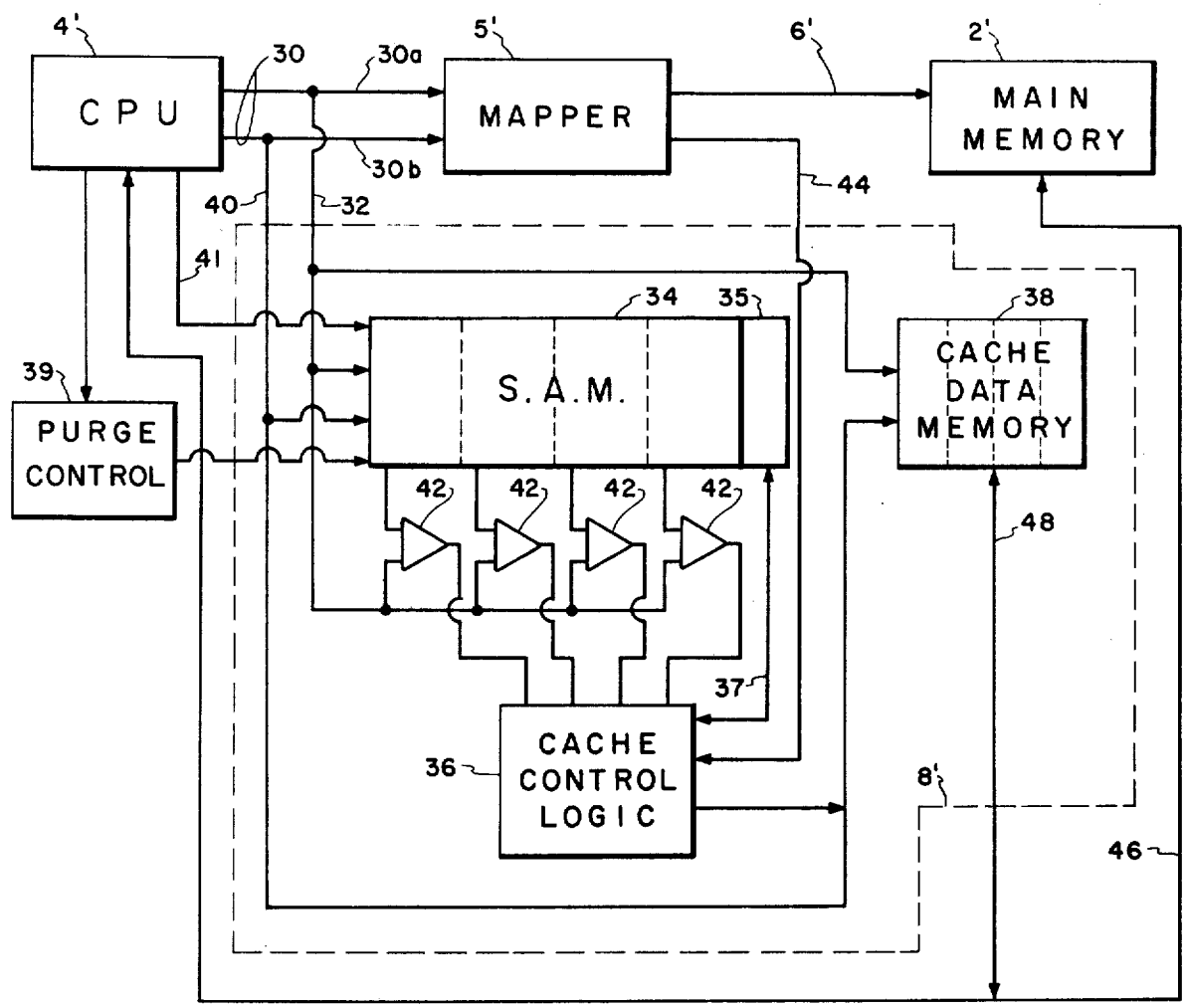
FIG. 3 is a block diagram showing greater detail of the cache memory arrangement in accordance with the present invention.

In the illustration of the present invention as shown in FIG. 3, that problem is overcome. The CPU 4' is connected to the mapper 5' by a connection means 30. The connection means 30, corresponding to the connection means 30 of FIG. 2, comprises two portions, 30a and 30b. The portion 30a carries a virtual address from the CPU 4' to the mapper 5'. The portion 30b carries an identifying program number from the CPU to the mapper 5' indicating which of the several programs of the computer system is in operation. The signals carried by these two portions of the connection means are interpreted by the mapper 5' to produce a physical address signal on the output connection means 6' to the Main Memory 2'.

The virtual address signals on the portion 30a are also applied to the cache 8' by a connector 32. The cache 8' includes a Set Associative Memory 34, a cache control logic 36 and a cache data memory 38. The Set Associative Memory 34 is divided into sets which correspond in number to the number of programs operative in the CPU 4'. Similarly, the cache data memory 38 is subdivided into sets corresponding to the number of sets in the Set Associated Memory. Thus, each of the operating programs in the CPU has a dedicated portion of the cache memory associated therewith. In the illustrative example shown in FIG. 3, there are four such sets shown. The means 30b interconnecting the CPU 4' and the mapper 5' carries a program identification number. That program identification number is also applied by way of the connection 40 to the input of the Set Associative Memory 34 and also to the input of the cache data memory 38. Virtual address signals appearing on the connection 32 are divided into two portions, the lower portion being applied to the Set Associative Memory 34 and to the cache data memory 38. These signals applied to the Set Associative Memory 34, and the cache data memory 36 together with the program identification number applied thereto from the connection 40 causes the Set Associative Memory to scan each of the sets and subsets for an address corresponding to that lower portion of the virtual address. The output of the several sets of the content addressable memory 34 are applied to one input terminal of each of a plurality of comparators 42. The higher portion of the virtual address from the connection 32 is applied in parallel to the other input terminal of all of the comparators 42. Only the set of addresses corresponding to the program-identifying number is enabled in the Set Associative Memory. That set is scanned by the lower portion of the virtual address signal to find an address, the upper portion of which corresponds to the upper portion of the virtual address applied to the other input terminal of the comparators 42. When such a correspondence is found, the activated comparator 42 will provide an output signal to the cache control logic 36 indicative of a "hit" signifying that the addressed data is, in fact, stored in the cache memory. The cache control logic also responds to the identity of the upper portion of the address and transmits that portion of the address also to the cache data memory.

It was previously noted that, if the data sought by the CPU was stored in a shared portion of the main memory 2', the request from the CPU would be flagged by the mapper, as set by the operating system, that the shared portion of the main memory was being addressed. Under those circumstances, the mapper 5' would issue an inhibit signal on the lead 44 which is applied to the cache control logic 36 to block the addressing of the cache data memory. Under those circumstances, the requested address is converted by the mapper 5' to a physical address in the Main Memory 2' and is transmitted thereto over the cable 6'. The data is retrieved from the main memory and is transmitted to the requesting CPU by the connector 46. With the cache data memory blocked by the inhibit signal, that data is not loaded into the cache data memory.

If, on the other hand, the requested data had not been from the shared portion of the Main Memory, and a "hit" had been indicated in the cache, the data would be retrieved from the cache data memory by way of the connecting cable 48. Similarly, if the requested address and data had not been from the shared portion of the main memory and the cache had indicated a "miss" signifying that the data requested is not stored in the cache data memory, the mapper again translates the requested address to a physical address in the Main Memory 2'. The data is then retrieved from the main memory by way of the connecting cable 46 and supplied to the requesting CPU. At the same time, however, the requested data is stored in the cache data memory along with the virtual address issued by the requesting CPU. In accordance with existing technology, if the particular portion of the cache is fully loaded, the new data replaces data which, for example, may be the least recently used item of data. To that end, the Set Associative Memory 34 includes a memory section 35 which keeps track of the transactions within the Set Associative Memory, and communicates with the cache control logic unit 36 by way of a connection means 37.

Figure 4:
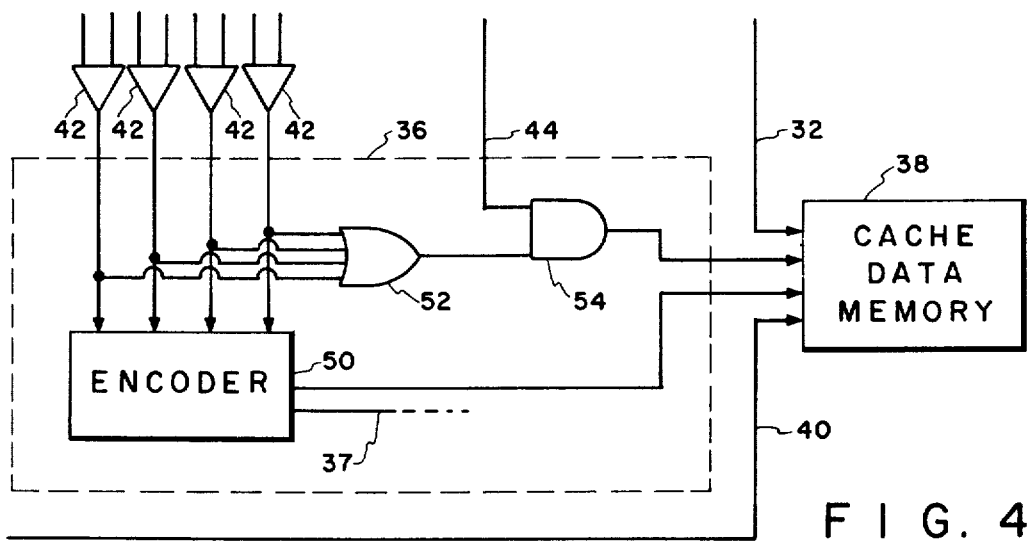
FIG. 4 is a diagram illustrating greater detail of one of the components of the structure shown in FIG. 3.

In FIG. 4 there is shown additional detail of the cache control logic 36. The output of the comparators 42 is input on the corresponding number of leads to an encoder 50. While the four comparators 42 are shown as individual units, it will be appreciated that each of the comparators 42 represents a multiple bit comparison with a multiple bit output. The output from the comparators 42 applied to the input of the encoder 50, when a "hit" occurs encodes that portion of the address representing the higher portion of the virtual address from the CPU 4'. That address information is combined with the lower portion of the address applied to the cache data memory 2' on the cable 32 and the program identifying number applied over the connection leads 40. The output from the comparators 42 are also applied through an OR gate 52, the output of which is connected to one input terminal of an AND gate 54. The other input terminal of the AND gate 54 is connected by the lead 44 to the output of the mapper 5'. The lead 44 carries the inhibit signal from the mapper whenever the requesting processor is addressing the shared portion of the main memroy. Thus the addressing of the cache data memory 38 is enabled by a "hit" signal from any of the comparators 42 through the OR gate 52 and the AND gate 54 unless the AND gate 54 is inhibited by the inhibit signal from the mapper.

From time to time, portions of the non-shared data in the main memory 2 will be modified, under the control of the CPU 4' with data supplied through, for example, the I/O processor 28 (FIG. 1) or the status of a group of addresses may change from non-shared to shared. The I/O processor 28, in turn, controls the transfer of information between the memory 2 and an I/O device which may be a data terminal, a tape or card reader, or the like. If the data from the modified portion of the memory 2 had previously been stored in the cache data memory, that data stored in the cache memory would be incorrect. Accordingly, means are provided for purging that portion of the cache memory corresponding to the portion of the Main Memory which had gone from non-shared to shared. To accomplish that purge, a purge control logic 39 responds to control signals from the CPU 4' to control the purging of the cache data memory through the Set Associative Memory 34. The CPU 4' identifies the range of addresses corresponding to the addresses of the data which have been changed in the main memory. The CPU also transmits a signal, by way of a connection 41, to the Set Associative Memory 34, identifying that a purge operation is called for. The CPU then generates a scan of the addresses in the cache and, when the addresses lying within the defined range occur, those addresses are purged from the Set Associative Memory. Then, when an address in that range is called for by the CPU, a "miss" occurs, the amended data is retrieved from the main memory and, in accordance with the "miss" routine, is stored in the cache.

Figure 5:
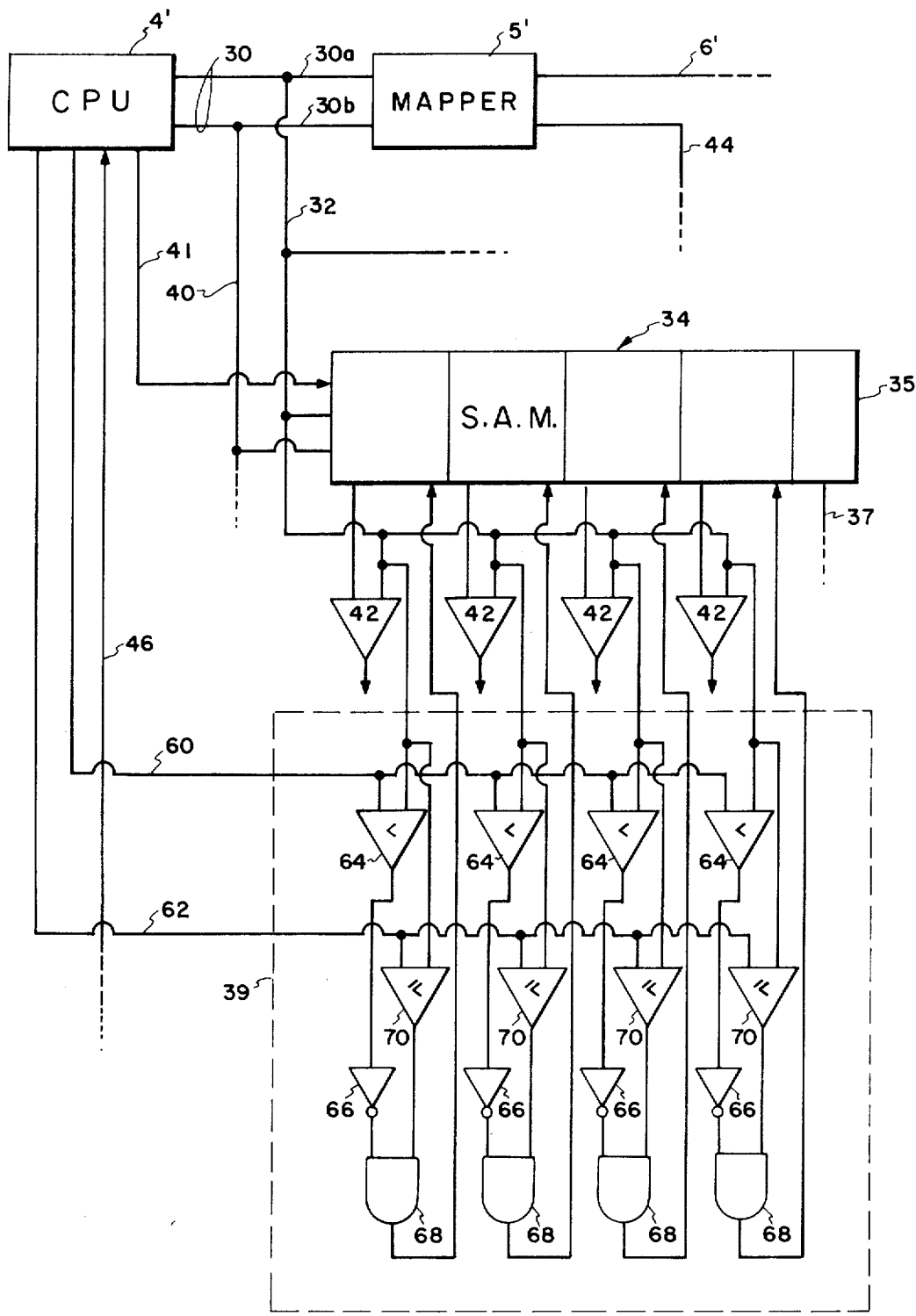
FIG. 5 is a diagram illustrating greater detail of the purge logic shown in FIG. 3.

In FIG. 5, there is shown a suggested arrangement for the purge control logic 39. From the CPU 4', a first connection means 60 carries a signal representative of the upper limit of the range of addresses to be purged. A second connection means 62 carries a signal representative of the lower limit of the range of addresses to be purged. The purge logic unit 39 includes a first set of comparators 64; four being shown, one for each of the major subdivisions of the Set Associative Memory 34. One input terminal of each of the comparators 64 is connected to the connection means 60 carrying the high or upper limit of the purge range. A second input terminal of each of the comparators 64 is connected to the lead means 32 from the CPU which carries the most significant digits of the scanning addresses from the CPU. The comparators 64 produce an output signal if the upper limit of the purge range is less than the address supply of the lead 32. That signal is inverted by an associated one of a plurality of inverters 66. The output of each of the inverters 66 is connected to one input of an AND gate 68.

A second set of comparators 70 is connected to have one input responsive to the lower limits of the range of signals supplied on the connection 62 by the CPU. The other input terminal of each of the comparators 70 is also connected to respond to the most significant bit portions of the address carried on the lead means 32. The output of each of the comparators 70 is connected to the other input terminal of the corresponding ones of the AND gates 68. The comparators 70 are arranged to produce an output signal if the lower limit signal on the connector 62 is equal to or less than the signal representing the addresses carried by the lead means 32.

In other words, if the signal representing the addresses from the CPU on the connection 32 are equal to or lie between the upper and lower limits set on the connections 60 and 62, an output signal will be issued from each of the AND gates 68. The output of the AND gate 68 is connected back to the corresponding segments of the Set Associative Memory 34 to effect a purge of the indicated addresses, only that segment of the Set Associative Memory 34 will be affected by the purge signal which has been enabled by the program number signal supplied on the connection 40 from the CPU. Thus the purge routine initiated by the CPU 4' will effectively purge from the cache the range of addresses corresponding to the addresses in the main memory which have been altered by the external means. Under those circumstances, when the CPU then calls for one of those addresses, the "miss" is indicated and the corrected data is retrieved from the main memory.

Thus, there has been provided, in accordance with the present invention, an improved computer system wherein cache memories are associated with each CPU having access to a single main memory unit. The cache memories are addressed in response to the virtual address signals issued by the CPUs and further are subdivided into sets corresponding to the number of programs included in the operating system of the individual CPUs.

The embodiments of the invention in which an exclusive property or privilege is claimed are defined as follows:

1. A computer system comprising:
a Main Memory unit;
a plurality of data processor units each having operative access to said main memory unit;
said Main Memory unit including addressable portions with physical addresses dedicated, respectively, to each of said processor units, said main memory unit having further addressable portions with physical addresses which are shared in common by said processor units;
a plurality of mapper units each connected, respectively, between an associated one of said data processing units and said Main Memory unit, for translating virtual address signals from said processor units into physical address signals for reference to said Main Memory unit;
a plurality of cache memory units each connected respectively, to an associated one of said processor units and directly responsive to said virtual address signals from said associated processor unit; and
said mapper units being responsive to virtual address signals from the associated ones of said processor units corresponding with said shared physical addresses in said Main Memory to produce an inhibit signal for inhibiting the recording of data from said Main Memory in the associated cache memory unit whenever said shared portion of said Main Memory is addressed.

2. A computer system comprising:
a Main Memory unit;
a plurality of data processor units each having operative access to said main memory unit;
said Main Memory unit including addressable portions with physical addresses dedicated, respectively, to each of said processor units, said main memory unit having further addressable portions with physical addresses which are shared in common by said processor units;
a plurality of mapper units each connected, respectively, between an associated one of said data processing units and said Main Memory unit, for translating virtual address signals from said processor units into physical address signals for reference to said Main Memory unit;
a plurality of cache memory units each connected respectively, to an associated one of said processor units and directly responsive to said virtual address signals from said associated processor unit; and
said mapper units being responsive to virtual address signals from the associated ones of said processor units corresponding with said shared physical addresses in said Main Memory to produce an inhibit signal for inhibiting the recording of data from said Main Memory in the associated cache memory unit whenever said shared portion of said Main Memory is addressed; and
purge control means connected to be responsive to control signals from said data processor units and connected to said cache memory units to selectively purge said cache memory unit of data corresponding to selected portions of said main memory unit.

3. A computer system comprising:
a Main Memory unit;
a plurality of data processor units each having operative access to said Main Memory unit;
each of said data processor units being severally controlled in accordance with a plurality of programs;
said main memory unit including addressable portions with physical addresses dedicated, respectively, to each of said processor units, said Main Memory unit having further addressable portions with physical addresses which are shared in common by said processor units;

a plurality of mapper units each connected, respectively between an associated one of said data processor units and said Main Memory unit for translating virtual address signals from said processor units into physical address signals for reference to said Main Memory unit;

a plurality of cache memory units each connected, respectively, to an associated one of said processor units and directly responsive to virtual address signals from said associated processor unit;

each of said cache memory units being subdivided into a plurality of address sets corresponding in number to said plurality of programs operatively associated with the corresponding processor unit, individual ones of said address sets in each of said cache memory units being dedicated to corresponding ones of said programs operative with the associated ones of said processor units, said individual ones of said sets being individually addressed in accordance with the identification of the corresponding program; and said mapper units being responsive to virtual address signals from the associated ones of said processor units addressed to aid shared portion of said main memory to produce an inhibit signal for inhibiting the operation of the associated cache memory unit whenever said shared portion of said main memory is addressed.

4. A computer system as set forth in claim 3 wherein each of said cache memory units includes a cache data memory subunit for storing selected data extracted from said Main Memory unit for use by the associated processor unit, each of said cache memory units also including a Content Addressable Memory subunit for storing address information relative to said selected data stored in said cache data memory subunit;

said cache data memory subunits and said Content Addressable Memory subunits being each subdivided into a plurality of address sets corresponding in number to said number of programs.

5. A computer system as set forth in claim 4 and including a purge control means for purging from said cache memory units, data in addresses corresponding to addresses in said main memory unit wherein data has been changed, said purge control means being connected to be responsive to control signals from said data processor unit, said control signals including signals defining a range of addresses to be purged, said purge control means being connected to said cache memory means to effect said purge.

* * * * *

UNITED STATES PATENT AND TRADEMARK OFFICE
CERTIFICATE OF CORRECTION

PATENT NO. : 4,264,953
DATED : April 28, 1981
INVENTOR(S) : Robert H. Douglas et al.

It is certified that error appears in the above—identified patent and that said Letters Patent is hereby corrected as shown below:

Delete the title page and substitute the attached page therefor.

Signed and Sealed this

Twenty-fifth Day of August 1981

[SEAL]

Attest:

GERALD J. MOSSINGHOFF

Attesting Officer    Commissioner of Patents and Trademarks